United States Patent Office 3,057,919
Patented Oct. 9, 1962

3,057,919
N-(SALICYL)-BENZAMIDE DERIVATIVES
Laurence A. Pursglove, Midland, Mich., assignor to The Dow Chemical Company, Midland, Mich., a corporation of Delaware
No Drawing. Filed Feb. 17, 1961, Ser. No. 89,920
5 Claims. (Cl. 260—558)

The present invention is directed to a novel process for the preparation of certain N-(salicyl)amides and to certain novel products prepared in the said process.

The compounds of the present invention correspond to the formula

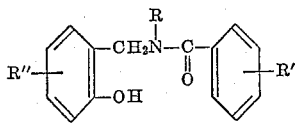

wherein R represents hydrogen, phenyl, alkylphenyl, alkyl or cycloalkyl, wherein alkyl is defined as an alkyl group being of one to 6, inclusive, carbon atoms; and wherein each of R' and R" is independently a member of the group consisting of hydrogen, bromine, chlorine, and nitro. When either of R' and R" is used to represent hydrogen it is to be understood that such hydrogen is a normal component of the benzenoid nucleus.

In the novel method of the present invention, the compounds are prepared by causing a reaction between an α-chloro-o-tolylbenzoate corresponding to the formula

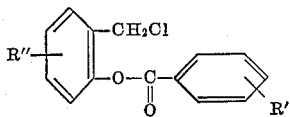

with a nitrogen compound corresponding to the formula

in the presence of a hydrogen chloride acceptor. In the resulting reaction, hydrogen from the said nitrogen compound combines with the chlorine of the chloromethyl group characteristic of the chlorotolylbenzoate compound, and liberates the elements of hydrogen chloride; the benzoyl moiety of the esterifying benzoate group exchanges position with a second hydrogen of the said nitrogen-containing compound whereby there arises the hydroxyl group characteristic of the salicyl moiety and the benzamide structure of the compounds of the present invention. These aspects of the reaction appear to take place as a single step reaction. The resulting compounds are of relatively low solubility in water, and of various solubilities in organic solvents; in general they are easily soluble in lower alkanols. In isolated form, they are crystalline solids. The compounds are useful as fungicides and as intermediates to be used in the preparation of biologically active derivative compounds.

The reactants may be combined in any order and in any relative proportion in the presence or absence of solvent and over a wide range of temperatures to cause a reaction and obtain products of the present invention in appreciable quantities. By the selection of preferred conditions yields of the present products are substantially increased.

In an advantageous method of carrying out the process of the present invention, the nitrogen containing compound, hydrogen chloride acceptor, and inert liquid reaction medium are mixed together and warmed to a temperature in a preferred reaction temperature range. Thereafter, the α-chloro-o-tolylbenzoate compound is added slowly, portionwise or continuously, over a period of time to avoid undue violence of the resulting reaction. Upon completion of the addition of reactants, the mixture is maintained at a preferred temperature range for a period of time to carry the reaction to completion. Thereafter, the desired product is recovered in any of various methods which will be known to skilled chemists. In one such method, liquid reaction medium is vaporized and removed. When hydrogen chloride acceptor is an alkali metal compound, the solid residue remaining after removal of reaction medium may be extracted with a lower alkanol whereby to elute the desired product leaving by-product alkali metal chloride and unreacted hydrogen chloride acceptor in the residue which may be discarded. Alternatively, the products may be separated by fractional distillation under subatmospheric pressure, whereby to remove volatile substances and obtain, in the distillate, a relatively pure product. Also, fractional crystallization and like purification procedures may be employed.

The process of the present invention goes forward slowly with preparation of desired product at any temperature from substantially lower than room temperature to temperatures so high as to cause thermal damage to the reactants or product. However, the lower extreme temperatures are regarded as disadvantageous since the reaction goes forward relatively very slowly; the higher reaction temperatures are regarded as relatively disadvantageous because of the likelihood of damage to reactants or product. Thus, while temperatures from approximately 0° to 250° C. are fully operative, a preferred temperature range is from 50° to 100° C.

Production of the desired products of the present invention begins immediately when the necessary reactants are brought into contact. Thus, no given duration of reaction time is regarded as critical; when it is desired to obtain good yields in proportion to employed amounts of starting material, in the preferred temperature range, reaction times generally will be of 1 to 3 hours duration. In the case of relatively more reactive starting materials, notably the nitrogen-containing compounds such as lower amines, shorter periods of time will be fully satisfactory. When employing less reactive substances, longer periods of time will usually result in higher yields of desired product. The reaction may be carried out under any pressure near to atmospheric pressure without any visible effect from the pressure. When employing a volatile or gaseous amine reactant, it is preferably introduced below the surface of the reaction mixture and may be maintained under pressure to minimize loss of reactant.

The reactants may be employed together in any desirable proportion of quantities. However, when it is desired to produce the present products efficiently and in good yield without undue waste of starting materials or preparation of unwanted by-products, about one mole of nitrogen-containing compound per mole of chlorotolylbenzoate compound should be employed and the employed hydrogen chloride acceptor should be in an amount sufficient to accept at least one mole of hydrogen chloride. The acceptor may be an excess of the nitrogen compound. The inert reaction medium may be alcohol, dimethyl formamide, dioxane, or other organic medium, or preferably, water.

The manner of using the process and making the products of the present invention will be evident to those skilled in the art from the following descriptions of specific embodiments of the process and the compositions resulting therefrom.

SPECIFIC EMBODIMENT 1

*Method of Synthesizing N-Cyclohexyl-N-Salicylbenzamide and Products Resulting Therefrom*

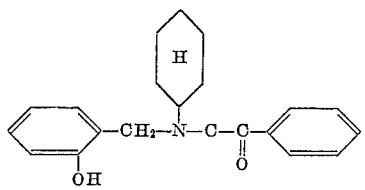

To 100 milliliters water were added 21 grams (0.25 mole) sodium bicarbonate and 39.6 grams (0.4 mole) cyclohexylamine. The resulting mixture was thoroughly stirred and warmed to 70° C. Thereupon, α-chloro-o-tolylbenzoate was added slowly, in small portions, over a 0.5 hour period, for a total addition of 49.2 grams (0.2 mole) of the said benzoate reactant.

The resulting reaction fixture was maintained in the temperature range of 65 to 70° C. with continuous vigorous stirring for 2.5 hours. Thereafter, the temperature was gradually raised to 86° C. and, under subatmospheric pressure, aqueous reaction medium was removed by vaporization. As a result of these operations there was obtained a white solid crude N-cyclohexyl-N-salicylbenzamide containing, as principal impurities, sodium chloride, sodium bicarbonate, and probably small amounts of cyclohexylamine hydrochloride. Such crude product is useful for the utilities and benefits resulting from the present invention and may be so employed. However, in the present specific embodiment the said crude white solid was vigorously extracted with 150 milliliters ethanol at 75° C. The resulting ethanol solution was reserved and the insoluble residue discarded. The ethanol was vaporized and removed whereupon there remained a relatively pure N-cyclohexyl-N-salicylbenzamide melting at 185–187.5° C.

The product is toxic to germinant spores of tomato early blight, *Alternaria solani* and, at rates of from 1 to 5 pounds per 100 gallons of resulting dispersion, when employed as a covering spray upon tomato plants, gave good protection to the tomato plants against succeeding incidence of spores of the said organism.

SPECIFIC EMBODIMENT 2

*N-Salicylbenzanilide*

To 100 milliliters water were added 21 gram (0.25 mole) sodium bicarbonate and 37.2 grams (0.4 mole) aniline. The resulting mixture was vigorously stirred and heated to 80° C.; thereat, α-chloro-o-tolylbenzoate was added in small portions slowly over a period of one half hour for the addition of a total amount of 49.2 grams (0.2 mole) of the said benzoate. The resulting reaction mixture was maintained at a temperature of 80°–90° C. for approximately 3 hours. As a result of these operations there was obtained a 2-phase mixture. The aqueous layer was decanted and discarded. The non-aqueous layer was exhaustively extracted with ethanol. The resulting ethanol product solution was warmed to vaporize and remove ethanol solvent and obtain a pale yellow crystalline N-salicyl-benzanilide product melting at 128.5–131.5°. The total product thus recovered represented 93 percent of theoretically perfect yield based upon the employed amount of α-chloro-o-tolylbenzoate starting material.

Similarly, yields from the process of the present invention generally vary between 55 and 95 percent of theoretically perfect yields based upon the amount of which starting material is the limiting amount.

SPECIFIC EMBODIMENT 3

To 100 millimeters of ethanol are added 25 grams (0.25 mole) potassium bicarbonate and 49.2 grams (0.2 mole) α-chloro-o-tolylbenzoate. The resulting mixture is vigorously stirred and heated to 35° C., in a closed, pressure-vented apparatus designed to maintain an interior superatmospheric pressure. Into the resulting reaction mixture monomethylamine is introduced as a gas through a tube extending into and beneath the surface of the liquid reaction mixture. A total of 6.2 grams methylamine is thus introduced, slowly and through a mineral sponge dispersing end upon the introduction tube, over a period of ½ hour. The resulting reaction mixture is maintained at the reaction temperature of 30°–50° C. for approximately one hour. During the reaction time, evolved carbon dioxide is vented off, and a white crystalline reaction product appears in the reaction mixture, maintained in suspension therein by the continued stirring and settling out when, at the end of the reaction time, stirring is discontinued. The resulting reaction mixture is thereafter filtered and the residue, consisting of essentially potassium chloride and potassium bicarbonate discarded; the ethanol solution comprising the desired N-methyl N-salicylbenzamide product is thereafter warmed under subatmospheric presure to vaporize and remove ethanol solvent and obtain a solid white benzamide product. The product is thereafter recrystallized from acetone and water to obtain a relatively pure N-methyl N-salicylbenzamide product. The product has a molecular weight of 235.3.

In similar preparations, employment of the following starting material prepares the stated following products:

From technical ar-butylaniline and pyridine as both hydrogen chloride acceptor and liquid reaction medium, by reaction with o-nitro-α-chloro-o-tolylbenzoate (melting at 88°–91° C.) at a reaction temperature of 110° C., there is obtained an N-butylphenyl-N(3-nitrosalicyl) benzamide having a molecular weight of 399.4 and being a white, crystalline solid at room temperature.

From p-sec.-amylaniline (boiling at 137°–140° C. under 20 millimeters pressure) with sodium bicarbonate as hydrogen chloride acceptor and by reaction with α,4-dichloro-o-tolylbenzoate (a waxy solid product melting in the range of 30°–55° C.) in water as reaction medium and at 250° C., there is prepared a N-p-sec.-amylphenyl-N(p-chlorosalicyl) benzamide as a white, crystalline solid having a molecular weight of 403.9.

From p-cyclohexylaniline and 5-nitro-α-chloro-o-tolyl 3-bromobenzoate in water as reaction medium and using sodium carbonate as hydrogen chloride acceptor, there is obtained an N-p-cyclohexylphenyl-N-(3-nitrosalicyl) 3-bromobenzamide as a white, crystalline solid having a molecular weight of 508.9.

By the reaction of 6-nitro-α-chloro-o-tolyl 2-chlorobenzoate with ammonia as both aminating reactant and hydrogen chloride acceptor in diethyl ether as reaction medium at 0° C., there is obtained a N-3-nitrosalicyl 2-chlorobenzamide as a crystalline solid having a molecular weight of 448.5.

By the reaction of n-hexylamine with 4-bromo-α-chloro-o-tolyl 3-nitrobenzoate in water as reaction medium and with sodium hydroxide as hydrogen chloride acceptor and at 10° C., there is obtained an N-n-hexyl-N-5-bromosalicyl 3-nitrobenzamide as a crystalline solid having a molecular weight of 433.3. By the reaction of tertiary-butylamine and 3-bromo-α-chloro-o-tolyl 4-bromobenzoate in water as reaction medium and with potassium carbonate as hydrogen chloride acceptor, there is obtained an N-tert.butyl-N-(6-bromosalicyl) 4-bromobenzamide as a crystalline solid having a molecular weight of 441.1.

From the reaction of 4-chloro-α-chloro-o-tolyl 3-chlorobenzoate and cyclopropylamine as aminating reactant, hydrogen chloride acceptor and liquid reaction medium at the boiling temperature of cyclopropylamine (approximately 50° C.) there is obtained N-cyclopropyl-N(5-chlorosalicyl) 3-chlorobenzamide having a molecular weight of 336.2.

The α-chloro-o-tolylbenzoate starting reactants to be employed according to the present invention are prepared by reacting one molecular proportion of chlorine with one molecular proportion of an o-tolylbenzoate of which the structure is the same as the desired starting reactant structure except that the methyl group characteristic of a tolyl compound is not chlorinated. The chlorination is carried out in the presence of phosphorus trichloride or phosphorus pentachloride and at a temperature in the range of 20° C. to 150° C. and preferably in the presence of light as stimulus to the desired chlorination reaction.

As employed in the instant specification and claims, the radical name "salicyl" refers to the nucleus having the structure

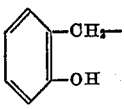

whereof the benzenoid nucleus may be variously substituted.

The compounds of the present invention are useful as fungicides. For such use, the unmodified compound may be used. Alternatively, the compounds may be dispersed on an inert finely divided solid and the resulting preparation employed as a dust. Also, such preparations may be dispersed in water with or without the aid of a wetting agent and the resulting aqueous suspensions employed as sprays. In other procedures, the compounds may be employed in organic solvent or as a constituent of solvent-in-water or water-in-solvent emulsions or as aqueous dispersions thereof which may be applied as spray, drench, or wash. Suitable organic solvents include ethanol, acetone, and methylethyl ketone.

I claim:

1. A method of preparing a compound corresponding to the formula

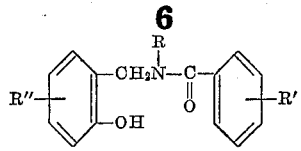

which comprises the step of causing a reaction between a compound corresponding to the formula

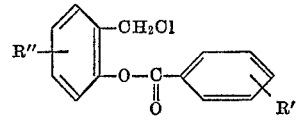

with a nitrogen compound corresponding to the formula

in the presence of a hydrogen chloride acceptor, wherein R represents hydrogen, phenyl, alkylphenyl, alkyl or cycloalkyl, any alkyl group being of one to 6, inclusive, carbon atoms; and wherein each of R' and R'' is independently a member of the group consisting of hydrogen, bromine, chlorine, and nitro.

2. N-cyclohexyl-N-salicylbenzamide.
3. N-salicylbenzanilide.
4. N-(5-bromosalicyl)-N-hexyl-3-nitrobenzamide.
5. N - (5 - chlorosalicyl)-N-cyclopropyl-3-chlorobenzamide.

References Cited in the file of this patent

Raiford et al.: Jour. Am. Chem. Soc., vol. 45, pages 1738–43 (1923).

Beilsteins Handbuch der Organischen Chemie, vol. XIII (4th ed.), pages 583, 587–88 (1930).

Cromwell et al.: Journ. Am. Chem. Soc., vol. 67, pages 1658–60 (1945).

Nigan et al.: Chemical Abstracts, vol. 43, page 6182 (1949).